United States Patent Office 3,743,607
Patented July 3, 1973

3,743,607
PALLADIUM-GOLD CATALYST
Kurt Sennewald, Hermulheim, near Cologne, Wilhelm Vogt, Efferen, near Cologne, and Hermann Glaser, Lechenich, Germany, assignors to Knapsack Aktiengesellschaft, Knapsack, near Cologne, Germany
No Drawing. Application Apr. 14, 1969, Ser. No. 816,121, which is a continuation-in-part of abandoned application Ser. No. 553,721, May 31, 1966. Divided and this application May 21, 1971, Ser. No. 145,979
Claims priority, application Germany, June 25, 1965, K 56,472; July 20, 1965, K 56,658; Apr. 1, 1966, K 58,898
Int. Cl. C07c 67/04
U.S. Cl. 252—430                                   9 Claims

ABSTRACT OF THE DISCLOSURE

An improved catalyst for the catalytic, vapor phase production of vinyl acetate from ethylene, acetic acid and molecular oxygen is shown. A catalyst for the synthesis reaction comprising metallic palladium and an alkali metal acetate or formate supported on a carrier is activated by including metallic gold therein. A preferred catalyst composition which shows substantially improved operating characteristics includes metallic palladium, an alkali metal acetate and metallic gold. Another preferred catalyst composition includes a low melting mixture of at least two alkali metal acetates.

---

This application is a division of application Ser. No. 816,121, filed Apr. 14, 1969. Application Ser. No. 816,121 is a continuation-in-part of application Ser. No. 553,721, filed May 31, 1966, now abandoned.

This application relates to a novel catalyst that is particularly useful in the manufacture of vinyl acetate from ethylene, acetic acid and molecular oxygen or air in the gas phase.

It is known that vinyl acetate can be prepared by reacting the starting materials named above, at a temperature between 120 and 250° C., preferably between 150 and 200° C., under a pressure between 1 and 10 atmospheres absolute, in contact with a supported catalyst which contains either pure palladium or palladium and other metals belonging to group 8 of the Periodic System in combination with elements which exist in various stages of valency and therefore enable the metals of group 8 to be oxidized intermediarily to the ionic state. These catalysts, which are rather costly owing to their relatively high content of noble metals, often produce unsatisfactory space/time yields and are unsuitable for use in commercial operations, Additionally, they have a durability unattractive especially for prolonged operation.

U.S. Pat. 3,190,912 describes a vapor phase process for the preparation of unsaturated esters, wherein the preferred catalysts are palladium or palladium salts which can be activated using about 1 to 10 equivalents of a metal halide promoter per equivalent of catalyst. The preferred metal halide promoters include cupric and ferric salts (Examples X and XIV); gold chloride is mentioned therein amongst quite a number of further metal chlorides (column 2, lines 39–51). The catalysts used in Examples I to XVIII inclusive produce extremely low vinyl acetate yields. In Example 12 hereinafter it will be shown that metallic iron and nickel in the palladium-containing catalyst used in accordance with the present invention fail to act as promoters.

Belgian Patent 648,814 describes a process for the manufacture especially of vinyl acetate by reacting ethylene, oxygen and acetic acid in the gas phase in the presence of a palladium catalyst which preferably contains alumina as the carrier, and alkali metal or alkaline earth metal acetates. The acetates, e.g. of lithium, sodium, potassium, magnesium and calcium, are used in a proportion of 1 to 20% by weight, referred to the weight of the carrier. As taught in Example 1b of that patent, the catalyst contains 2% by weight palladium (reduction of $PdCl_2$ with hydrazine) and 1% by weight lithium acetate. Vinyl acetate is obtained in a yield of 47.5 grams per liter of catalyst per hour. 57.3 grams vinyl acetate are obtained per liter of catalyst per hour when the catalyst contains 20% by weight lithium acetate as shown in Example 1c of the above patent.

Belgian Pat. 638,489 describes a process for making vinyl esters from fatty acids in contact with supported catalysts containing palladium, platinum, rhodium, ruthenium or iridium and activated by means of copper, silver, zinc, cadmium, tin, lead, chromium, molybdenum, tungsten, iron, cobalt or nickel. Working Example 1 in that patent describes more specifically the manufacture of vinyl acetate in contact with a Pd-Cu-active carbon-catalyst which contains 8.66% by weight Pd and 5.45% by weight Cu and has been obtained by reducing $PdCl_2$ and $CuCl \cdot 2H_2O$ by means of hydrogen in the presence of active carbon. It can readily be determined that this catalyst which is very costly owing to its high Pd-content achieves no more than a space/time yield of 23 grams vinyl acetate per liter of catalyst per hour.

An improved catalyst and process has now been found for making vinyl acetate from ethylene, acetic acid and molecular oxygen or air in the gas phase. A mixture of these reactants is passed in contact with supported catalyst containing metallic palladium, an alkali metal formate or acetate, and metallic gold. The supported catalyst should contain 0.1 to 6.0, preferably 0.2 to 2.0% by weight palladium, 0.01 to 10%, preferably 0.1 to 4.75% by weight gold and 1 to 20% preferably 1 to 5% by weight alkali metal formate or acetate.

The palladium and gold-containing supported catalyst is conveniently prepared by reducing a palladium salt and a gold salt or a gold complex compound to metallic palladium and metallic gold in the presence of a carrier. The reducing agents include hydrazine hydrate, alkali metal formate/formic acid, sodium boronate ($NaBH_4$), hydroquinone or hydrogen. The carrier is preferably silicic acid or aluminum oxide or silicate, aluminum phosphate, pumice, asbestos or active carbon.

For Pd- and Au- contents as low as 1% and 0.04% by weight, respectively, which keep the catalyst price low, the catalyst according to this invention is found to have an activity or to produce a space/time yield of 50 grams vinyl acetate per liter of catalyst per hour. The apparent density of the catalyst of the present invention being as low as 0.39 kg./liter, it is found that 12.8 grams vinyl acetate will be obtained per hour per gram Pd. As compared with other processes, the quantity of vinyl acetate produced per gram Pd per hour is found to be substantially higher. This means a considerable advance in the art. The catalyst activity remains constant over long periods of time.

It is generally known how such catalysts are prepared. One of the catalyst carriers named above is impregnated with an aqueous solution of a palladium salt, e.g. $PdCl_2$, $Pd(NO_3)_2$ or $Pd(CH_3COO)_2$, and of a gold salt, e.g. $AuCl_3$ or tetrachloroauric (III)-acid ($H[AuCl_4] \cdot 4H_2O$), and the resulting mixture is evaporated to dryness. The mass so obtained is introduced then into an aqueous solution containing an appropriate reducing agent, e.g. hydrazine, capable of reducing both the palladium and gold salts to the metallic state. Once the reduction is complete, the catalyst mass is removed from the liquid by filtration, and washed with water.

When the reduction was achieved by means of a reducing agent free from alkali, e.g. hydrazine, the catalyst is conveniently impregnated with an about 10% solution of sodium acetate. The formates or acetates of lithium or potassium can also be used. The catalyst is dried subsequently and is then ready for use. In the absence of such treatment, despite the gold it contains, the catalyst is found to have a substantially lower activity, e.g. of only 15 grams vinyl acetate per liter of catalyst per hour, instead of the 50 grams or—as shown below—the 90–120 grams vinyl acetate yield obtained per liter of catalyst per hour. Catalysts which have been reduced by means of a composition comprising sodium formate and formic acid are found to be active even if no sodium acetate has been added thereto.

The carrier materials generally should have an active surface area of 50 to 400 square meters/gram. The carrier is preferably silicic acid having an active surface area e.g. of 180 square meters/gram, determined by the BET-method, and an apparent density e.g. of 0.39 kg./liter. Silicic acid is preferred to other carriers, such as silicates or aluminum oxide, as the silicic acid absolutely resists the action of acetic acid present in the reaction gas.

The catalyst prepared in the manner set forth above is placed into a reaction tube 25 mm. wide and a mixture outside the limits of explosion and formed e.g. of 50% by volume ethylene, 30% by volume air and 20% by volume acetic acid in vapor form is caused to travel through the reaction tube at a temperature within the range of 150 to 220° C., preferably 170 to 195° C., and under a pressure between 1 and 10 atmospheres absolute. A catalyst containing as little as 1% by weight Pd, 0.04% by weight gold and in addition thereto 1 to 20, preferably about 1 to 4% by weight alkali metal acetate deposited on a silicic acid carrier, enables under these conditions and under an operating pressure of 6 atmospheres absolute a space/time yield of 50 grams vinyl acetate to be obtained per liter of catalyst per hour. As compared therewith, a catalyst prepared in analogous manner, save that it contains 4% Pd but no gold, produces, after activation by means of air and nitrogen at 170° C., a space/time yield of only 22 grams vinyl acetate per liter of catalyst per hour. The same catalyst, when charged with a mixture of ethylene, acetic acid and oxygen in the absence of nitrogen even fails to produce detectable traces of vinyl acetate. In contrast therewith, as shown in Example 3 below, the palladium-gold catalyst of this invention need not be activated by means of air and/or nitrogen at 170° C.

The present invention also relates to a process for making vinyl acetate from ethylene, acetic acid and molecular oxygen or air in the gas phase in contact with a supported catalyst containing metallic palladium and an alkali metal salt in the amounts discussed above, the catalyst having been activated by means of metallic gold and containing 1 to about 40, preferably 10 to 30 atom percent gold, referred to the gram atoms palladium plus gold.

In U.S. Pat. 3,190,912 referred to hereinabove it is suggested that at least 50 atom percent promoter (no metallic gold is suggested therein for use as a promoter), based upon the total atoms of palladium and promoter, be used in order just to produce a promoter effect. In the present invention, however, it would be uneconomic (high gold price) and technically even disadvantageous to use more than about 40 atom percent metallic gold. This can very readily be deduced from working Examples 6, 7 and 8. It is here interesting to note that Example 7 using 30 atom percent gold produces a space/time yield of 120 grams vinyl acetate per liter of catalyst per hour, and that Example 6 using 40 atom percent gold produces up to 110 grams vinyl acetate per liter of catalyst per hour, whereas Example 8, which is given for the purpose of comparison only and uses 50 atom percent gold, produces no more than up to 93 grams vinyl acetate per liter of catalyst per hour.

The present invention finally relates to a process for making vinyl acetate from ethylene, acetic acid and molecular oxygen or air in the gas phase in contact with a supported catalyst containing metallic palladium, metallic gold and an alkali metal acetate, wherein the supported catalyst preferably contains low-melting mixtures of sodium and/or potassium and/or rubidium and/or cesium acetates.

The catalyst may contain palladium and gold in the amounts discussed above and in addition 0.5 to 5% by weight each of sodium and/or potassium and/or rubidium and/or cesium in the form of their acetates. A special feature of the present invention comprises using a supported catalyst which contains a eutectic mixture of at least two of the alkali metal acetates named above. The catalyst preferably contains sodium acetate and potassium acetate in a molar ratio of about 1:1, and the carrier again is more especially silicic acid ($SiO_2$) or aluminum oxide, aluminum silicate, aluminum phosphate, pumice, asbestos or active carbon.

It has unexpectedly been found that the vinyl acetate space/time yields and more particularly the lifetime of the supported catalyst until regeneration thereof can be substantially increased when the catalyst is impregnated with a solution prepared from a mixture of various acetates of the metals Na, K, Rb or Cs instead of impregnation with a solution of a single alkali metal acetate.

The low melting point of the alkali metal acetate mixtures named above obviously contributes to some extent to the catalyst activity, lower mixed melting points resulting in higher space/time yields and/or in a prolonged lifetime of the catalyst. It is especially advantageous to use a eutectic mixture (melting point: 210° C.) prepared from potassium acetate (melting point: 292° C.) and sodium acetate (melting point: 324° C.).

The improved space/time yields and the increased lifetime of catalysts impregnated in the manner set forth above are facts of considerable commercial significance. These effects are illustrated in Examples 10 and 11 below.

The following examples illustrate both the preparation and use of the catalyst according to this invention:

EXAMPLE 1

1 kg. of silicic acid strands 3 mm. wide were mixed with an aqueous solution containing 10 grams Pd in the form of $PdCl_2$ and 0.4 gram Au in the form of $H[AuCl_4]$, and thoroughly impregnated. The whole was dried then with agitation and the dried mass was slowly introduced at 40° C into a solution which contained about 3% hydrazine hydrate. The palladium chloride and the chloroauric acid underwent immediate reduction accompanied by the evolution of nitrogen. When the reduction was complete, supernatant water was poured off, the whole was after-washed with distilled water, and the moist catalyst was introduced into an about 10% solution of sodium acetate. Supernatant sodium acetate solution was removed by decantation and the catalyst was dried in vacuo at about 60° C. The catalyst so prepared contained about 1% Pd, 0.04% Au (corresponding to 2.13 atom percent gold, referred to the gram atoms palladium plus gold) and 1.8% Na in the form of $CH_3COONa$. It was found to have a surface of 69 square meters per gram (determined by the BET-method).

EXAMPLE 2

400 cc. of the catalyst mass prepared in the manner set forth in Example 1 were placed into an 18/8 chrome-nickel steel tube 25 mm. wide in which was placed a chrome-nickel steel core tube which had an external diameter of 14 mm. and was intended to receive thermo-resistors for temperature determination, and the catalyst mass was maintained at a temperature of 170° C. by gentle heating of the tube in a liquid bath. A gas mixture formed of 90 normal liters (measured at N.T.P.) $C_2H_4$, 50 normal liters air and 100 grams acetic acid was caused to travel under a pressure of 6 atmospheres absolute through the tube held in upright position. The reaction mixture leaving the reaction tube was cooled down to −70° C. to isolate condensable matter, and the condensed matter was analyzed by distillation. Vinyl acetate was initially obtained in a space/time yield of 44 grams and, after 4 hours, in a constant space/time yield of 50 grams per liter of catalyst per hour.

EXAMPLE 3

The catalyst of Example 1 was used in the manner described in Example 2 save that before the ethylene/acetic acid/air-mixture was introduced the catalyst was subjected to an "activating" after-treatment by means of air at 170° C. and then treated with nitrogen. Vinyl acetate was initially obtained in a space/time yield of 41 grams, and after some time, in a constant space-time yield of 47 grams per liter of catalyst per hour.

EXAMPLE 4

1 kg. of a silicic acid carrier in the form of balls having a diameter of 4 mm. was mixed with an aqueous solution which contained 8 grams Pd in the form of $PdCl_2$ and 3 grams Au in the form of $H[AuCl_4]$, and thoroughly impregnated. The whole was dried then with agitation in order uniformly to distribute the noble metal salts on the carrier, and the dried mass was slowly introduced at 40° C. into an about 4 to 5% solution of hydrazine hydrate. Once the noble metal compounds had been reduced, supernatant liquid was poured off, the whole was thoroughly after-washed with distilled water, and the moist catalyst was introduced into an 11.9% solution of potassium acetate. Supernatant potassium acetate solution was removed by decantation and the catalyst was dried then in vacuo to 60° C. The catalyst so prepared was found to contain about 0.8% Pd, 0.3% Au (corresponding to 16.88 atom percent gold, referred to the gram atoms palladium plus gold) and 2.5% K in the form of $CH_3COOK$.

350 cc. of the catalyst mass was placed into an 18/8 chrome-nickel steel tube having an internal diameter of 25 mm. in which was placed a chrome-nickel steel core tube which had an external diameter of 14 mm. and was intended to receive thermo-resistors for temperature determination, and the catalyst mass was maintained at 170° C. by gentle heating of the tube. A gas mixture formed of 90 normal liters (measured as N.T.P.) ethylene, 65 normal liters air and 120 grams acetic acid was caused to travel under a pressure of 6 atmospheres absolute through the tube held in an upright position. The gas mixture leaving the tube was cooled down to −70° C. in order to remove condensable matter, and the condensed matter was analyzed by distilling it. Vinyl acetate was obtained in a space/time yield of 106 grams per liter of catalyst per hour. Within 19 days of operation, the space/time yield was found to decrease to 90 grams vinyl acetate per liter of catalyst per hour. The average daily decrease in catalyst activity was determined to be 0.84 gram vinyl acetate per liter of catalyst per hour.

EXAMPLE 5

A catalyst prepared in the manner set forth in Example 4 save that the potassium acetate solution had been replaced by an 8.1% solution of lithium acetate for impregnation was found to produce vinyl acetate in a space/time yield of 87 grams per liter of catalyst per hour under identical reaction conditions. The catalyst contained about 0.8% Pd, 0.3% Au and about 1% Li in the form of $CH_3COOLi$. After 15 days of operation, the catalyst activity decreased to about 46 grams vinyl acetate per liter of catalyst per hour. The average daily decrease in catalyst activity was determined to be 2.73 grams vinyl acetate per liter of catalyst per hour.

EXAMPLE 6

1 kg. of silicic acid in the form of strands 3 mm. wide was mixed with an aqueous solution containing 10 grams Pd in the form of $PdCl_2$ and 12.7 grams Au in the form of $H[AuCl_4]$, and thoroughly impregnated. The whole was then dried with agitation in order to uniformly distribute the noble metal compounds on the carrier. The dried mass was slowly introduced at 40° C. into a 3% solution of hydrazine hydrate. The palladium chloride and the chloroauric acid underwent immediate reduction accompanied by the evolution of nitrogen. Once the reduction was complete, supernatant water was poured off, the whole was thoroughly after-washed by means of distilled water, and the moist catalyst was introduced into an about 10% solution of sodium acetate. Supernatant sodium acetate solution was removed by decantation and the catalyst was dried in vacuo at 60° C. The catalyst so prepared was found to contain about 1% by weight Pd, 1.27% by weight Au and 1.8% by weight Na in the form of $CH_3COONa$. The catalyst contained 40 atom percent gold, referred to the gram atoms palladium plus gold, and was ready for immediate use.

350 cc. of the catalyst mass so prepared were placed into an 18/8 chrome-nickel steel tube having an internal diameter of 25 mm., in which was placed a chrome-nickel steel core tube which had an external diameter of 14 mm. and was intended to receive thermo-resistors for temperature determination, and the catalyst mass was maintained at 170° C. by gentle heating of the tube. A gas mixture formed of 120 grams acetic acid, 90 normal liters (measured at N.T.P.) ethylene and 65 normal liters air was caused to travel under a pressure of 6 atmospheres absolute through the tube held in an upright position. The gas mixture leaving the reaction tube was cooled down to −70° C. in order to remove condensable matter, and the condensed matter was analyzed by distilling it. The catalyst so prepared produced vinyl acetate in an initial space/time yield of 83 grams per liter of catalyst per hour which increased within 24 hours to a constant rate of 105 to 110 grams vinyl acetate per liter of catalyst per hour. After 200 hours of operation, the catalyst activity could not be found to have practically decreased.

EXAMPLE 7

A catalyst prepared in the manner set forth in Example 6 and containing 1% by weight palladium and 0.79% by weight gold (corresponding to 30 atom percent gold; referred to the gram atoms of the two noble metals) produced 120 grams vinyl acetate per liter of catalyst per hour under the conditions set forth in Example 6.

EXAMPLE 8

A catalyst prepared in the manner set forth in Example 6 and containing 1% by weight palladium and 1.84% by weight gold (corresponding to 50 atom percent gold, referred to the gram atoms of the two noble metals) produced 91 to 93 grams vinyl acetate per liter of catalyst per hour under the conditions set forth in Example 6.

EXAMPLE 9

1 kg. of a silicic acid carrier in the form of balls having a diameter of 4 mm. was impregnated with an aqueous solution containing 8 grams Pd in the form of $PdCl_2$ and 3 grams Au in the form of $H[AuCl_4]$, and dried with agitation in order to uniformly distribute the noble metal compounds on the carrier. The dried mass was slowly introduced at 40° C. into a 4 to 5% solution of hydrazine hydrate. When the reduction of the noble metal compounds was complete, supernatant liquid was poured off, the whole was thoroughly washed with distilled water and the moist catalyst was introduced into an about 10% solution of sodium acetate. Supernatant sodium acetate solution was removed by decantation and the catalyst was dried then in vacuo at 60° C. The catalyst so prepared was found to contain about 0.8% by weight Pd, 0.3% by weight Au and about 1.8% Na in the form of $CH_3COONa$.

350 cc. of the catalyst mass so obtained were placed into an 18/8 chrome-nickel steel tube having an internal diameter of 25 mm., in which was placed a chrome-nickel steel core tube which had an external diameter of 14 mm. and was intended to receive thermo-resistors for temperature determination, and the catalyst mass was maintained at 170° C. by gentle heating of the tube. A gas mixture formed of 120 grams acetic acid, 90 normal liters (measured at N.T.P) ethylene, and 65 liters air was caused to flow under a pressure of 6 atmospheres absolute through the tube held in an upright position. The gas mixture leaving the reaction tube was cooled down to —70° C. to remove condensable matter, and the condensed matter was analyzed by distilling it. The catalyst produced vinyl acetate in an initial space/time yield of 83 grams which increased within 24 hours to 110 grams per liter of catalyst per hour and decreased within 17 days of operation to 70 grams vinyl acetate per liter of catalyst per hour. The average daily decrease in activity was determined to be 2.35 grams vinyl acetate per liter of catalyst per hour.

EXAMPLE 10

A catalyst prepared in the manner set forth in Example 9 save that the 10% solution of sodium acetate had been replaced with an 11% solution of potassium and sodium acetate (molar ratio of

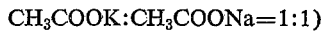
$CH_3COOK:CH_3COONa=1:1$)

for impregnation, produced vinyl acetate in a space/time yield of 116 grams per liter of catalyst per hour under identical conditions. The catalyst contained about 0.8% Pd, 0.3% Au, 0.8% Na in the form of $CH_3COONa$ and 1.5% K in the form of $CH_3COOK$. This catalyst was found to have an especially long lifetime. After 52 days of operation, the catalyst activity still was 110 grams vinyl acetate per liter of catalyst per hour. The average daily decrease in activity was determined to be as low as 0.12 gram vinyl acetate per liter of catalyst per hour.

EXAMPLE 11

A catalyst prepared in the manner set forth in Example 9 and containing 0.8% Pd and 0.3% Au, which had been after-impregnated with an 11% solution of sodium and potassium acetate (molar ratio of $CH_3COONa:CH_3COOK$ of 1:1) and which thus contained about 0.8% Na in the form of $CH_3COONa$ and about 1.5% K in the form of $CH_3COOK$, enabled vinyl acetate to be produced in a space/time yield of 146 grams per liter of catalyst per hour. After 18 days of operation, the catalyst could not be found to produce remarkably lower space/time yields. An identical catalyst which, however, had not been impregnated with the alkali metal acetate solution produced no more than 10 to 20 grams vinyl acetate per liter of catalyst per hour.

EXAMPLE 12

For the purpose of comparison only, catalysts (a) to (d) specified below were prepared under conditions analogous to those reported in Example 4 above and used under the reaction conditions described therein for vinyl acetate production. As can be seen, metallic iron and nickel failed to produce any promoter effect, whereas metallic chromium produced only an insignificant promoter effect. As compared therewith, catalyst (e), which was prepared and used under identical conditions, was found to have a considerably improved productivity for as low a metallic gold content as 14.7 atom percent Au, based upon the total atoms of palladium and gold.

| Catalyst composition in weight percent (Carrier: silicic acid, K in the form of $CH_3COOK$): | Catalyst productivity in grams vinyl acetate per liter of catalyst per hour |
|---|---|
| (a) 0.5% Pd; 3% K | 40 |
| (b) 0.5% Pd; 3% K; 1.3% Fe | 35–40 |
| (c) 0.5% Pd; 3% K; 1.3% Ni | 39.6 |
| (d) 0.5% Pd; 3% K; 1.3% Cr | 51 |
| (e) 0.5% Pd; 3% K; 0.16% Au | 93 |

What is claimed is:
1. A catalyst consisting essentially of metallic palladium, metallic gold, alkali metal acetate and a carrier therefor, the palladium being present in a concentration of 0.1 to 6% by weight, the gold being present in a concentration of 0.01 to 10% by weight, and the alkali metal acetate being present in a concentration of 1 to 20% by weight.
2. A catalyst as defined in claim 1 wherein the concentration of palladium is 0.2 to 2% by weight.
3. A catalyst as defined in claim 1 wherein the concentration of gold is from 0.1 to 4.75% by weight.
4. A catalyst as defined in claim 1 wherein the alkali metal acetate is sodium acetate.
5. A catalyst as defined in claim 1 wherein the alkali metal acetate is potassium acetate.
6. A catalyst as defined in claim 1 wherein the alkali metal acetate is a 1:1 molar mixture of sodium acetate and potassium acetate.
7. A catalyst as defined in claim 1 wherein the carrier is a member selected from the group consisting of silicic acid, aluminum oxide, aluminum silicate, aluminum phosphate, pumice, asbestos and active carbon.
8. A catalyst as defined in claim 1 wherein the carrier has an active surface area of about 50 to 400 square meters per gram.
9. A catalyst as defined in claim 1 wherein the carrier is silicic acid.

References Cited
UNITED STATES PATENTS

| 3,650,983 | 3/1972 | Miller | 260—497 A X |
| 3,631,079 | 12/1971 | Sennewald et al. | 252—430 X |
| 2,802,889 | 8/1957 | Frevel et al. | 252—460 X |
| 3,156,735 | 11/1964 | Armstrong | 260—680 E |
| 3,190,912 | 6/1965 | Robinson | 260—497 A |
| 3,488,295 | 1/1970 | Sennewald et al. | 252—413 |
| 3,534,093 | 10/1970 | Gerberich et al. | 260—533 R |
| 3,600,429 | 8/1971 | Kronig et al. | 252—430 X |

PATRICK P. GARVIN, Primary Examiner

U.S. Cl. X.R.

260—497 A